US008767710B2

(12) United States Patent
Chen et al.

(10) Patent No.: US 8,767,710 B2
(45) Date of Patent: Jul. 1, 2014

(54) WIRELESS COMMUNICATION SYSTEM

(75) Inventors: Jian Wen Chen, Los Angeles, CA (US);
Lin Chen, Beijing (CN); Yonghua Lin,
Beijing (CN); Qing Wang, Beijing (CN);
Rong Yan, Beijing (CN); Zhen Bo Zhu,
Beijing (CN)

(73) Assignee: **International Business Machines
Corporation**, Armonk, NY (US)

( * ) Notice: Subject to any disclaimer, the term of this patent is extended or adjusted under 35 U.S.C. 154(b) by 157 days.

(21) Appl. No.: 13/392,887

(22) PCT Filed: Aug. 17, 2010

(86) PCT No.: PCT/EP2010/061960
§ 371 (c)(1),
(2), (4) Date: Mar. 16, 2012

(87) PCT Pub. No.: WO2011/023592
PCT Pub. Date: Mar. 3, 2011

(65) Prior Publication Data
US 2012/0163299 A1    Jun. 28, 2012

(30) Foreign Application Priority Data
Aug. 31, 2009    (CN) .......................... 2009 1 0170969

(51) Int. Cl.
*H04J 3/06*    (2006.01)
(52) U.S. Cl.
USPC ........................................................ 370/350
(58) Field of Classification Search
None
See application file for complete search history.

(56) References Cited

U.S. PATENT DOCUMENTS

| 6,016,322 | A | 1/2000 | Goldman |
| 7,436,813 | B2 | 10/2008 | Kim et al. |
| 7,493,129 | B1 | 2/2009 | Mostafa et al. |
| 2003/0012158 | A1 | 1/2003 | Jin et al. |
| 2003/0021231 | A1* | 1/2003 | Evans .......................... 370/230 |
| 2004/0057543 | A1* | 3/2004 | Huijgen et al. ............... 375/356 |
| 2005/0157675 | A1 | 7/2005 | Feder |
| 2007/0177552 | A1 | 8/2007 | Wu et al. |
| 2009/0318089 | A1* | 12/2009 | Stratford et al. ........... 455/67.11 |
| 2010/0220712 | A1* | 9/2010 | Zhang et al. .................. 370/350 |

FOREIGN PATENT DOCUMENTS

| AU | 2004208744 A1 | 2/2005 |
| CN | 1698295 | 11/2005 |
| EP | 1699148 A1 | 9/2006 |
| WO | WO-2004030241 A1 | 4/2004 |
| WO | WO-2006040653 A1 | 4/2006 |
| WO | WO-2008088762 A1 | 7/2008 |
| WO | WO-2009048094 A1 | 4/2009 |
| WO | WO 2009049511 A1 * | 4/2009 |

* cited by examiner

*Primary Examiner* — Chirag Shah
*Assistant Examiner* — Rina Pancholi
(74) *Attorney, Agent, or Firm* — Vazken Alexanian

(57) ABSTRACT

A wireless communication system base station, and a remote radio head (RRH) and a computer-implemented synchronization method for the wireless communication system base station. The RRH is communicably coupled to a baseband unit (BBU) of the wireless communication system base station through a network, and the BBU processes and transmits downlink data to the RRH. The RRH includes: a time-delay measurement unit for measuring a time-delay for the downlink data to arrive at the RRH from the BBU; and a time-delay notification unit for notifying from the RRH to the BBU of time-delay data on the time-delay measured by the time-delay measurement unit, wherein the time-delay data is used to advance the starting time for the BBU to process and transmit the downlink data by an amount of time obtained based on the time-delay data.

17 Claims, 6 Drawing Sheets

WIRELESS COMMUNICATION SYSTEM

CROSS-REFERENCE TO RELATED APPLICATION

This is a U.S. National Phase application which claims priority from International Application PCT/EP2010/061960, filed Aug. 17, 2010, which in turn claims priority from Chinese Patent Application No. 200910170969.2, filed on Aug. 31, 2009. The entire contents of both of these applications are incorporated herein by reference.

BACKGROUND

The present invention generally relates to wireless communication systems, specifically, to data transmission synchronization between a baseband unit and a remote radio head of a wireless communication system base station in wireless access network.

The latest generations of wireless communication systems use remote radio head (RRH) technology in a distributed base station architecture where all radio related functions are included in a Remote Radio Head which can be installed next to the antenna and which allows for greater distances between the RRH and antenna of a base station (BS) and the baseband unit (BBU) of the BS, reducing set-up and operational costs. The BS can centralize multiple BBUs and deploy the RRHs and the antennae in a distributed manner. FIG. 1 shows an architecture supporting dynamic RRH stream-switching for different BBU boards, wherein a plurality of BBU boards serve as a resource pool to provide processing resources for RRHs in an on-demand manner.

In digital communication network, reliably transmitting audio, video and data requires accurate timing and synchronization. In traditional implementation of communication between a BBU and a RRH, the BBU and RRH of a base station are connected directly through a TDM (time division multiplexing) link, on which data is transmitted at clock of the TDM link, and thus transmission time-delay is generally fixed and transmission jitter is not generated. Furthermore, processing time-delay is also generally fixed due to the use of computing platforms based on DSP/FPGA, (Digital Signal Processing/Field Programmable Gate Arrays) etc., which do not have operating system.

Next generation wireless access network architecture commonly adopts time division duplex (TDD) wireless communication system, for which data transmission between a BBU and a RRH is based on a packet switching network, such as Ethernet or Infiniband, and switch, and thereby data transmission time-delay is generally not fixed and transmission jitter may occur. Due to the use of computing and transmitting resource pool based on open IT architecture, processing time-delay is not fixed under the influence of operation system (e.g. task scheduling, etc.).

SUMMARY OF THE INVENTION

The present invention provides a wireless communication system base station and data transmission synchronization method thereof. (as defined in the appended claims, to which reference should now be made).

In one aspect, the present invention provides a remote radio head (RRH) of the wireless communication system base station, which is communicably connected to a baseband unit (BBU) of the wireless communication system base station through a network, wherein the BBU is used to process and transmit downlink data to the RRH, said RRH further comprising: a time-delay measurement unit for measuring a time-delay for the downlink data to arrive at the RRH from the BBU; a time-delay notification unit for notifying the BBU of time-delay data on the time-delay measured by the time-delay measurement unit from the RRH, said time-delay data being used to advance a starting time for the BBU to process and transmit the downlink data by an amount of time obtained based on said time-delay data.

In another aspect, the present invention provides a wireless communication system base station, which comprises a remote radio head (RRH) and a baseband unit (BBU) which are communicably connected through a network, wherein the BBU is used to process and transmit downlink data to the RRH, said wireless communication system base station further comprising: a time-delay measurement unit in the RRH for measuring a time-delay for the downlink data to arrive at the RRH from the BBU; a time-delay notification unit in the RRH for notifying the BBU of time-delay data on the time-delay measured by the time-delay measurement unit from the RRH; a synchronization unit in the BBU for advancing a starting time for the BBU to process and transmit downlink data by an amount of time obtained based on the time-delay data notified by the time-delay notification unit.

In another aspect, the present invention provides a synchronization method for data transmission of wireless communication system base station that comprises a remote radio header (RRH) and a baseband unit (BBU) communicably connected through a network, wherein the BBU is used to process and transmit downlink data to the RRH, said method comprising: measuring a time-delay for the downlink data to arrive at the RRH from the BBU; notifying the BBU of time-delay data on the measured time-delay from the RRH; advancing a starting time for the BBU to process and transmit the downlink data by an amount of time obtained based on the notified time-delay data.

The present invention can reduce or even eliminate RRH reception time-delay caused by BBU processing time-delay and data transmission jitter by measuring the time-delay for the downlink data frame to arrive at the RRH of the base station whereby correcting the timing pulse for starting downlink data processing and transmission on the BBU side.

BRIEF DESCRIPTION OF THE DRAWINGS

The aforementioned and other objects, features and advantages of the present invention will become more apparent from the detailed description of the embodiments of the present invention shown in the accompanying drawings, in which the like or the same reference numbers are used to indicate the like or the same elements, or parts in the embodiments of the present invention.

DETAILED DESCRIPTION

Hereinafter, the implementation of the present invention will be described in detail with reference to the drawings, which show embodiments of the present invention. However, the present invention can be implemented in various ways, and is not conceived to be limited to the disclosed manners. Parts and details that are not directly relevant to the contents of the present invention are omitted in the description and drawings, so that the content of the present invention can be highlighted, and those skilled in the art can understand the scope of the present invention more clearly.

Figure 1:
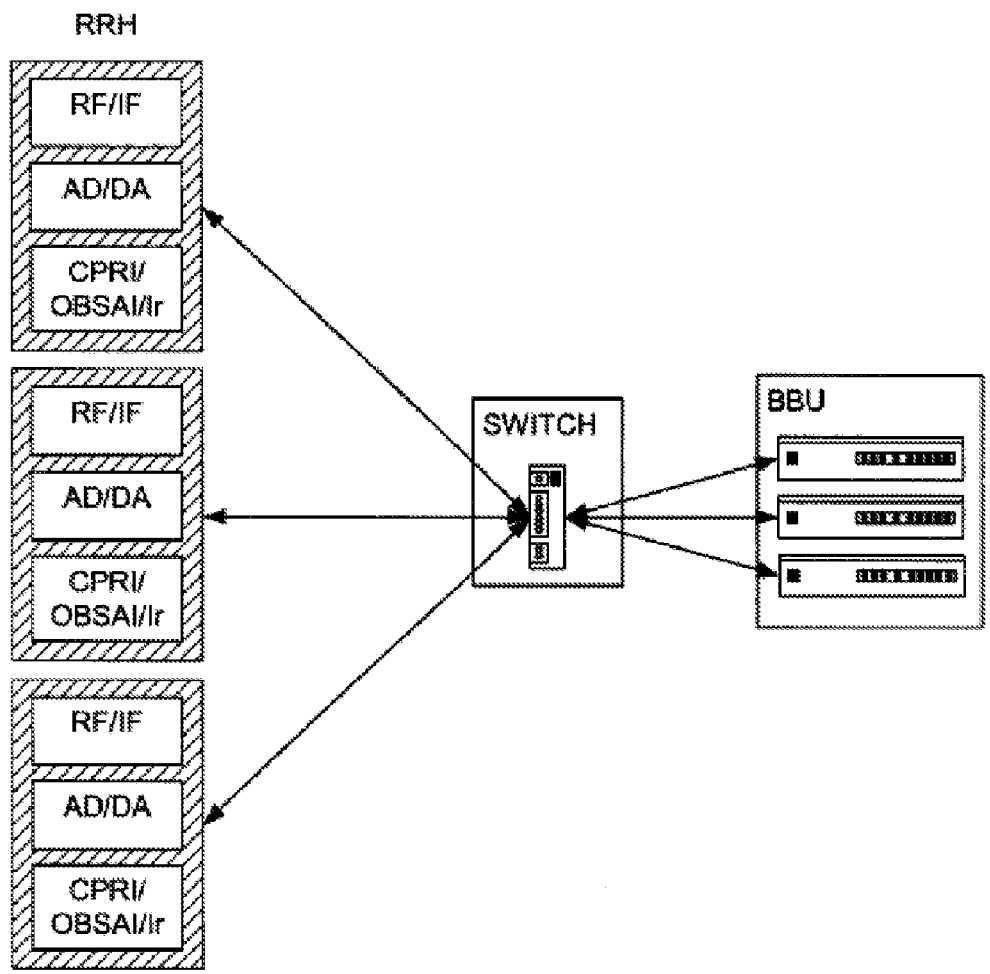
FIG. 1 schematically shows an architecture in which the technical solution of the present invention can be implemented.

First, a reference is made to FIG. 1 showing the architecture of a wireless communication system base station in which the technical solution of the present invention can be implemented. The base station shown comprises several remote radio heads (RRH) and several centralized baseband units communicably connected to the RRHs through a network (a packet-switch network, such as, Ethernet-based or Infiniband-based network). Through a switch (generally, near the baseband unit side), any RRH can be connected to any BBU to form an uplink or downlink. The RRH is responsible for converting digital data received from the BBU to RF carriers for radio transmission and vice versa from received radio signals. The RRH receives uplink data from a mobile communication terminal (not shown) through functional components, such as A/D converter, etc., and then transmits the data to the BBU for processing; the RRH receives downlink data from the BBU through the network, and then transmits the downlink data to the mobile communication terminal through functional components, such as D/A converter, etc.

Figure 2:
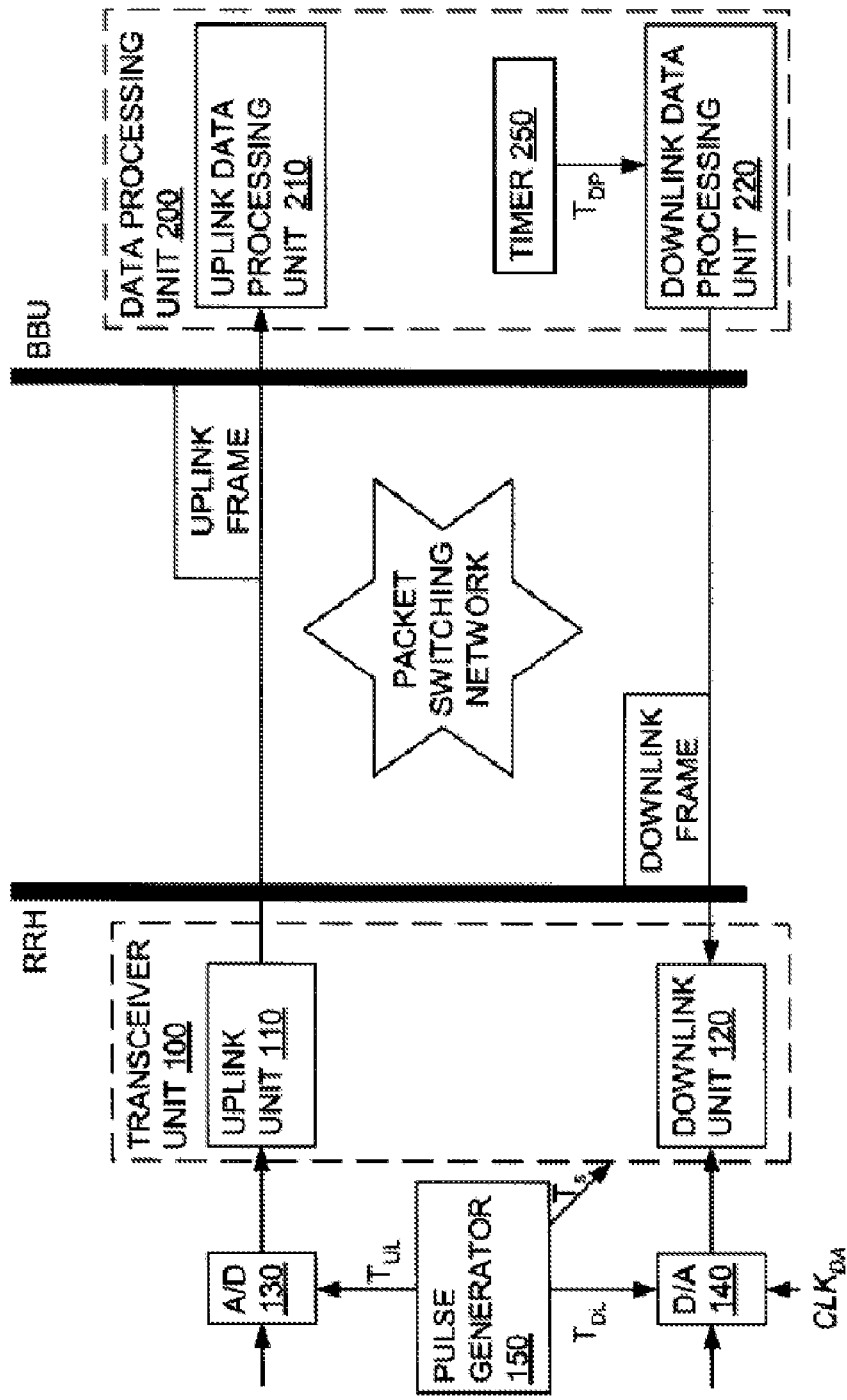
FIG. 2 schematically shows a partial structure of a wireless communication system base station and the operation manner thereof.

FIG. 2 schematically shows a partial structure of the wireless communication system base station and the operation manner thereof. In the wireless communication system base station (which is also referred to as base station hereinafter) shown in FIG. 2, only one remote radio head (which is also referred to as RRH hereinafter) and one baseband unit (which is also referred to as BBU hereinafter) are illustrated, wherein the RRH and the BBU are communicably connected through a packet switching network, (such as Ethernet) and communicate data in a TDD communication manner.

As shown in FIG. 2, the RRH comprises a transceiver unit 100, a pulse generator 150, an analog to digital converter (which is also simplified as A/D hereinafter) 130 and a digital to analog converter (which is also simplified as D/A hereinafter) 140. The BBU comprises a data processing unit 200 and a timer 250.

The transceiver unit 100 of the RRH is used to receive and transmit data between the A/D 130 and the BBU and between the D/A 140 and the BBU, and further comprises an uplink unit 110 and a downlink unit 120, wherein the uplink unit 110 is used to receive data from the A/D 130, process the received data and transmit the processed data to the BBU over a network; the downlink unit 120 is used to receive downlink data from the BBU over the network and transmit the received downlink data to the D/A 140.

The data processing unit 200 of the BBU is used to receive and process the uplink data from the RRH, and to process and transmit the downlink data to the RRH. The data processing unit 200 further comprises an uplink data processing unit 210 for receiving and processing the uplink data from the RRH and a downlink data processing unit 220 for processing and transmitting the downlink data to the downlink unit 120 of the RRH.

The base station can be switched between uplink mode and downlink mode in operation. When the base station is in uplink mode, its communication hardware circuits serve for the BBU to receive data, i.e. uplink data from a mobile communication device (not shown). The A/D 130 receives analog signals from the mobile communication device, converts the signals into digital signals, and then transmits them to the transceiver unit 100 of the RRH. The transceiver unit 100 processes the digital signals, for example, groups and encapsulates the digital signals into frames, and then transmits them to the BBU over a packet switching network for further processing by the BBU's data processing unit 200.

When the base station is in downlink mode, its communication hardware circuits serve for the BBU to transmit data, i.e. the downlink data, to the mobile communication device. The BBU transmits the data having been processed by the data processing unit 200 to the transceiver unit 100 of the RRH over the packet switching network. The transceiver unit 100 processes the received data, for example, restores data from the frames, and then transmits the processed data to the D/A 140, which converts the data into analog signals and then transmits them to the mobile communication device.

The pulse generator 150 is used to issue timing pulses for various circuit modules of the RRH, including uplink pulse $T_{UL}$, downlink pulse $T_{DL}$ and switching pulse $T_s$.

In uplink mode, the uplink pulse $T_{UL}$ is used to trigger the A/D 130 to receive uplink data from the mobile communication device. In downlink mode, the downlink pulse $T_{DL}$ is used to trigger the D/A 140 to transmit downlink data to the mobile communication device. The switching pulse $T_s$ is used to trigger switching between the uplink mode and the downlink mode. In downlink mode, after the switching pulse $T_s$ is issued from the pulse generator 150, the D/A stops transmitting data to the mobile communication device, and the hardware circuits of the RRH are switched to uplink data processing state. In uplink mode, after the switching pulse $T_s$ is issued from the pulse generator 150, the A/D stops receiving data from the mobile communication device, and then the hardware circuits of the RRH are switched to downlink data processing state.

It should be appreciated by those skilled in the art that, the timing pulses which can be provided by the pulse generator 150 are much more than those pulses mentioned above, and those pulses mentioned above can also be generated by different pulse generators which are physically discrete, for which no further description will be given herein.

The timer 250 can issue timing pulses for various circuit modules of the BBU, including timing baseband processing pulse $T_{DP}$. The data processing pulse $T_{DP}$ is used to trigger the operation of the downlink data processing unit 220 of the data processing unit 200, i.e. to start processing the downlink data to be transmitted to the RRH, for example, encapsulating data into frames and transmitting the downlink data frames (which is simplified as downlink frame hereinafter) to the RRH.

It should be appreciated by those skilled in the art that a downlink frame consists of a frame header and a frame body, and the frame body may comprise one or more data samples, each of which is data with certain length, for example, 16 bits or 32 bits.

The transceiver unit 100 of the RRH receives downlink frames from the BBU, and it may take some time for the RRH to receive a downlink frame completely, and the time is called downlink frame duration. Similarly, the uplink data frame transmitted from the RRH to the BBU (which is simplified as uplink frame hereinafter) comprises a frame header and one or more data samples, and the time required to transmit an uplink frame completely is called uplink frame duration.

The cycle from the beginning of a downlink frame to the end of an uplink frame constructs an uplink-downlink period. The length of the uplink-downlink period=downlink frame duration+time required to switch between downlink mode and uplink mode+uplink frame duration. In a configuration, for example, the uplink-downlink period is 10 ms, wherein the downlink frame duration is 4.5 ms, the time required to switch between DL and UL is 0.5 ms, and the uplink frame duration is 5 ms.

The frequency of the downlink pulse $T_{DL}$ is set to match the uplink-downlink period. For example, if the uplink-downlink period is 10 ms, then the frequency of $T_{DL}$ is 100 Hz, i.e. the pulse generator 150 issues a downlink pulse $T_{DL}$ every 10 ms.

In normal situation, the timing mechanisms in RRH and BBU make the downlink frame synchronized between the BBU and the RRH, that is, the downlink frame is synchronized with the downlink pulse $T_{DL}$ and the switching pulse $T_S$. In other words, when a downlink pulse $T_{DL}$ is issued, the first data sample of a downlink frame should have already arrived at the transceiver unit 100 and been received by the transceiver unit 100; when a switching pulse $T_s$ is issued, the last data sample of the downlink frame should have already arrived at the transceiver unit 100; otherwise, the whole downlink frame would not be transmitted to the mobile communication device by the D/A 140 during the current period.

It should be appreciated by those skilled in the art that the time for the downlink frame data sample to arrive at the transceiver unit can be influenced by both downlink data processing and transmission time-delay of the data processing unit 200 (processing time-delay) and transmission line jitter. For example, the processing time-delay of the data processing unit 200 of the BBU may render that the first data sample of the downlink frame arrives at the transceiver unit after a delay.

Figure 3:
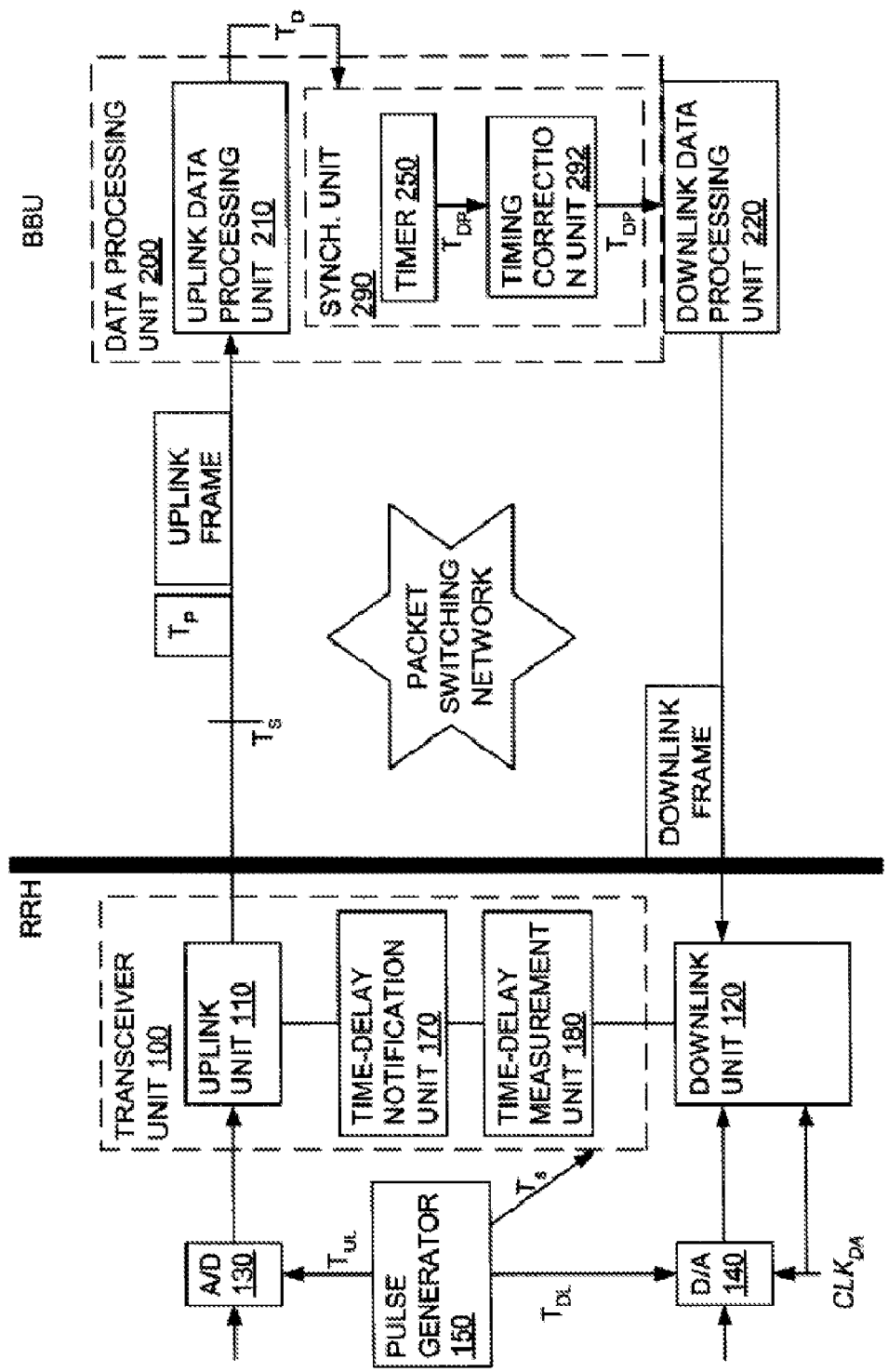
FIG. 3 schematically shows a partial structure of a wireless communication system base station according to an embodiment of the present invention, and the operation manner thereof.

Referring to FIG. 3 below, various implementations of the present invention will be described. FIG. 3 shows a partial structure of the wireless communication system base station according to one embodiment of the present invention and the operation manner thereof. The components shown in FIG. 3 are mostly the same as those of FIG. 2, except that FIG. 3 also comprises a time-delay measurement unit 180 and a time-delay notification unit 170 in the RRH, and a synchronization unit 290 in the BBU.

The RRH shown in FIG. 3, as an embodiment of the RRH of the wireless communication system base station according to the present invention, is communicably connected to the BBU comprising the synchronization unit 290 through a network, so as to construct a wireless communication system base station according to an embodiment of the invention. The RRH and the base station will be described in detail with reference to the drawings below.

The time-delay measurement unit 180 is used to measure the time-delay for the downlink data to arrive at the RRH from the BBU. The time-delay for the downlink data to arrive at the transceiver unit and thus the RRH from the BBU can be measured by setting a timer in the RRH to record the time that the downlink data should arrive at the transceiver unit 100 of the RRH and the time that the downlink data actually arrived at the transceiver unit respectively, and then calculating the difference between the two times. The particular implementation of the time-delay measurement unit will be further described with reference to FIG. 5 below.

The time-delay notification unit 170 is used to notify the BBU of time-delay data on the time-delay measured by the time-delay measurement unit 180. Especially, the time-delay notification unit 170 may receive time-delay data on the time-delay for downlink data to arrive at the RRH from the BBU, process the time-delay data appropriately, for example, encapsulate it into a frame, and then transmit the frame to the BBU in gaps for transmitting the uplink frame. According to one embodiment of the present invention, as shown on the upper half of FIG. 3, the time-delay notification unit 170 may, upon switched from downlink mode to uplink mode, transmit time-delay data to the BBU just following the transmission of an uplink frame by the uplink unit. To facilitate processing and transmitting the time-delay data, according to one embodiment of the present invention, the time-delay notification unit may be provided in the uplink unit 110 of the RRH, or alternatively, the uplink unit can be reconstructed to have the function of the time-delay notification unit, which is easy to implement for those skilled in the art, and thus no further description will be given herein.

The synchronization unit 290 is used to advance the starting time for the BBU to process and transmit downlink data by an amount of time obtained based on the time-delay data $T_D$ notified by the time-delay notification unit 170.

For example, upon receiving (e.g., through uplink unit 110) the RRH time-delay data from the RRH according to a predetermined protocol, the data processing unit 200 (e.g., the uplink data processing unit 210) of the BBU processes the time-delay data (e.g., restores the time-delay data from a frame), and then transmits it to the synchronization unit 290. The synchronization unit 290 takes the time-delay data as an adjustment parameter, for example, to make the time for the data processing unit 200 to thereafter process and transmit the downlink data be advanced by an amount of time-delay indicated by the time-delay data, so that the next downlink frame can arrive at the RRH earlier.

It should be appreciated by those skilled in the art that, the measured frame header time-delay $T_{d1}$ is often due to the processing time-delay for the data processing unit 200 of the BBU to process the downlink data, and the frame trailer time-delay $T_{d2}$ characterizes the sum of the frame header time-delay $T_{d1}$ and the jitter time-delay for transmission of a data frame. Therefore, generally speaking, for example, if $T_{d1}=T_{d2}$, it is often indicated that there has no jitter in the data transmission of the base station; on the other hand, if $T_{d2}$ is significantly larger than $T_{d1}$, it is indicated that there has obvious jitter in data transmission. In implementation of the present invention, clock can be corrected based on different clock correction algorithms, so as to adjust the triggering or starting time for the data processing unit 200 to process and transmit the downlink data, that is, to advance the triggering or starting time for the data processing unit 200 to process and transmit the downlink data. According to one embodiment of this invention, the larger one of $T_{d2}$ and $T_{d1}$ can be used as a reference parameter to perform the above adjustment. For example, if $T_{d2}$ is larger than $T_{d1}$, the starting time for the data processing unit 200 to process and transmit the downlink data can be advanced by an amount of time $T_{d2}$.

Considering that jitter is rapidly-varying, the whole system may easily get into an unstable state if performing the adjustment based on $T_{d2}$ every time. According to an embodiment of the present invention, for example, if there is an insignificant difference between $T_{d1}$ and $T_{d2}$, merely taking $T_{d1}$ as the reference parameter to perform the adjustment is also possible, e.g. advancing the starting time for the data processing unit 200 to process and transmit the downlink data by an amount of time $T_{d1}$.

Of course, in practice, a more complicated reference parameter can be used for adjustment depending on the specific ranges of $T_{d1}$ and $T_{d2}$. According to an embodiment of the present invention, for example, the sum of the average of $(T_{d2}-T_{d1})$ over a period of time and the current $T_{d1}$ can be used as the reference parameter to perform the adjustment. For example, the sum of the average of $(T_{d2}-T_{d1})$ for each of N periods prior to the current uplink-downlink period and the current $T_{d1}$, can be used as the reference parameter to perform the adjustment, wherein N is an integer larger than 1.

Figure 4:
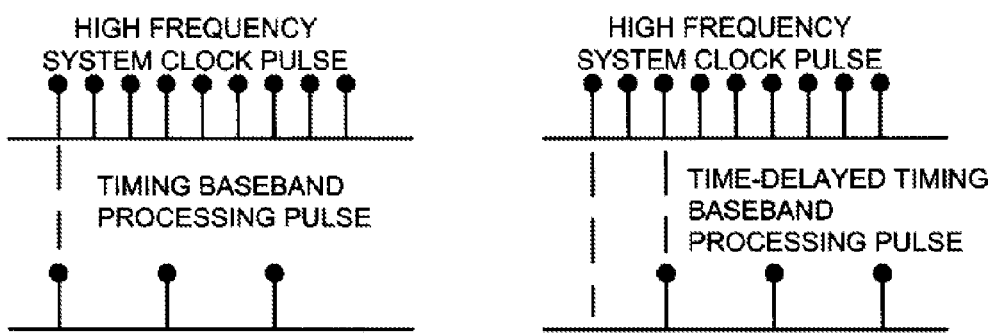
FIG. 4 schematically shows the variation of the baseband processing pulse according to an embodiment of the present invention.

According to one embodiment of the present invention, the synchronization unit can be implemented with a timing correction unit in the conventional technology, which may generate a time-delayed clock pulse to replace a timing baseband processing pulse for triggering the downlink data processing unit 200 to start the downlink data processing and transmission, based on said timing baseband processing pulse and the time-delay data, so as to advance the starting time for the downlink data processing unit to process and transmit the downlink data by the amount of time mentioned above. Referring to FIG. 4, FIG. 4 schematically shows the variation of the timing baseband processing pulse for triggering the downlink data processing unit to process and transmit the downlink data after the use of the timing correction unit according to the embodiment of the present invention. The lower left of FIG. 4 shows the timing baseband processing pulse before the correction, and the lower right shows the time-delayed timing baseband processing pulse, i.e. the timing baseband processing pulse adjusted by the timing correction unit. Comparing the timing baseband processing pulse on the lower left and the time-delayed timing baseband processing pulse on the lower right of FIG. 4 using the same high frequency system clock pulse shown over them as a reference, it can be seen that, the time-delayed timing baseband processing pulse has a higher frequency, and thus the starting time for downlink data processing unit 200 to process and transmit the downlink data triggered by the time-delayed timing baseband processing pulse will be advanced.

The timing correction unit 292 according to an embodiment of the present invention is shown in FIG. 3, wherein the timing correction unit 292 takes the timing baseband processing pulse $T_{DP}$ output from the timer 250 as one input and the time-delay data $T_D$ serving as the adjustment parameter as another input, and outputs a time-delayed timing baseband processing pulse $T_{DP'}$. Those skilled in the art of electronic circuits may understand that, such timing correction unit 292 can be a circuit structure easily realized in conventional technology and thus no further description will be given herein. It should be noted that, although the timing correction unit 292 shown in FIG. 3 takes the timing baseband processing pulse $T_{DP}$ as one input, in a practical implementation, as well known by those skilled in the art, the time-delayed timing baseband processing pulse $T_{DP'}$ output by the correction unit also can be an input of the timing correction unit so as to form a feedback, which will not be described in detail herein.

Next, the embodiment of the time-delay measurement unit of the present invention will be further described. In the case of using the pulse generator 150 in the RRH to generate the downlink pulse $T_{DL}$ for triggering the downlink data transmission of D/A 140 to the mobile communication device, a frame header time-delay measurement means 181 of the present invention can be used to obtain the time that the D/A 140 begins to transmit downlink data to the mobile communication device by obtaining the time of the downlink pulse, in addition, since it is the first data sample of the downlink frame the downlink unit 120 receives from the BBU, the time for the first data sample of the downlink frame to arrive at the RRH can be obtained from the downlink unit. Thus, with two timers and one subtracter, the frame header time-delay measurement means can be realized as a means for measuring the time difference between the generating time of the downlink pulse $T_{DL}$ and the time when the first data sample of the downlink frame of the BBU arrives at the downlink unit. Similarly, the frame trailer time-delay measurement means 182 can be further simply realized as a means for measuring a second time difference between the generating time of the switching pulse Ts and the time when the last data sample of the downlink frame of the BBU arrives at the downlink unit.

Figure 5:
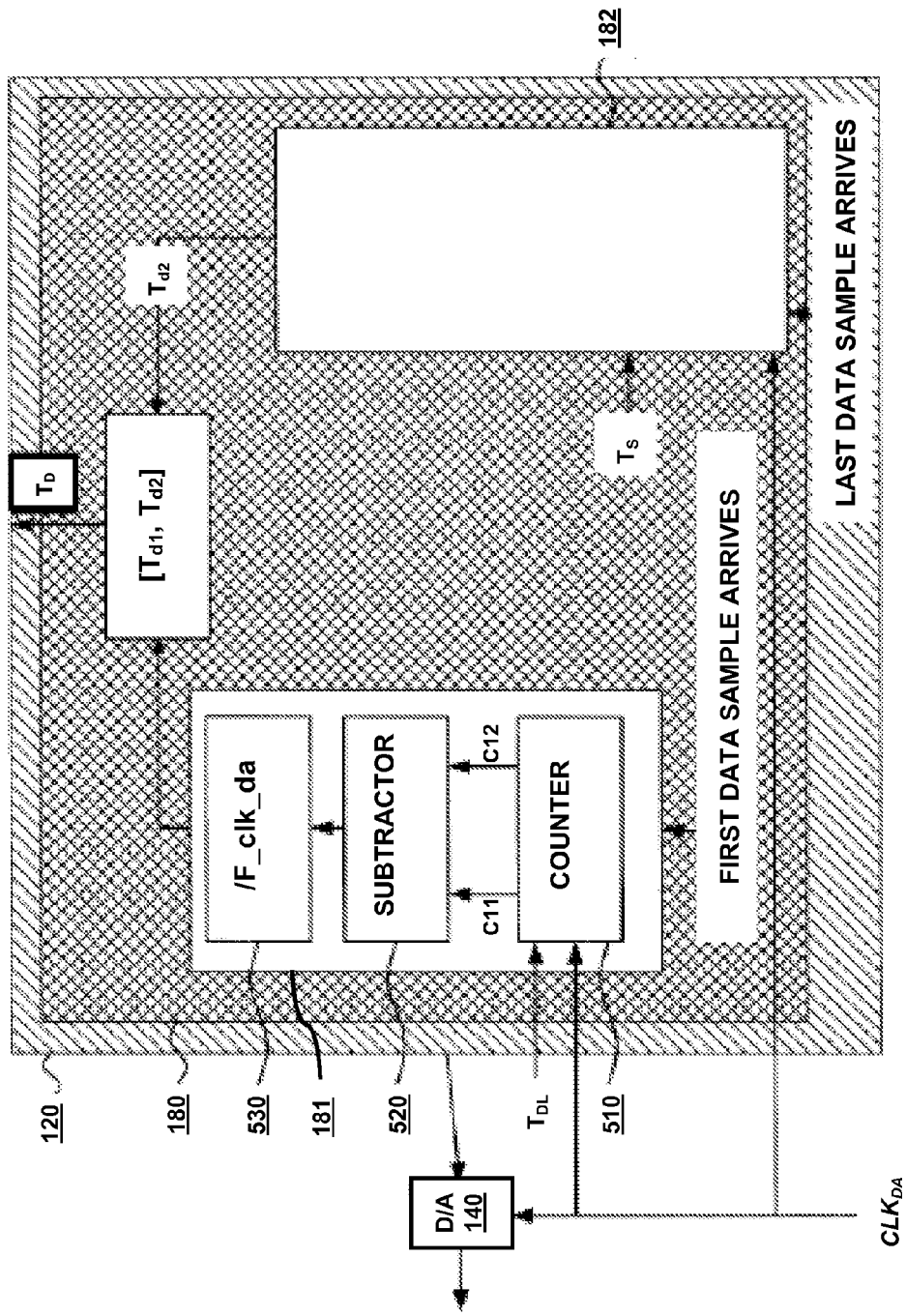
FIG. 5 schematically shows the circuit of the time-delay measurement unit according to an embodiment of the present invention.

FIG. 5 illustratively shows a circuit implementation of a time-delay measurement means according to an embodiment of the present invention. As shown in FIG. 5, the frame header time-delay measurement means 181 comprises a counter 510, a subtracter 520, and a divider 530, wherein the counter takes the downlink pulse $T_{DL}$, a notification from the downlink unit indicating that the first data sample of the downlink frame has arrived at the downlink unit 120, and a beat clock pulse $CLK_{DA}$ as its inputs, wherein the beat clock pulse $CLK_{DA}$ is a beat clock pulse provided by the system clock for the digital-to-analog conversion of the data samples of the downlink data one by one by the D/A 140, which is a high frequency pulse as compared to the pulses $T_{DL}$ and $T_{UL}$, and can also be generated by the same pulse generator 150.

The counter 510 continually counts the clock pulses $CLK_{DA}$. As shown in FIG. 5, when a downlink pulse $T_{DL}$ is issued, the counter 510 is triggered to output the current count value $C_{11}$; for example, a notification issued by the downlink unit 120 indicating that the first data sample of the downlink frame has arrived at the downlink unit 120 triggers the counter 510 to output the current count value $C_{12}$; and the absolute value of the difference between $C_{11}$ and $C_{12}$ is obtained through the operation of the subtracter. As shown with "/F_clk$_{DA}$" in block 530, the absolute value is divided by the frequency F_clk$_{DA}$ of the beat clock pulse $CLK_{DA}$ to get the frame header time-delay $T_{d1}$. The above circuit can be expressed as:

$$T_{d1}=|C_{11}-C_{12}|/F\_CLK_{DA}$$

where $C_{11}$ is the current count value of the counter 510 when the $T_{DL}$ is issued, $C_{12}$ is the current count value of the counter 510 when the first data sample of the downlink frame arrives, and F_CLK$_{DA}$ is the frequency of the beat clock pulse $CLK_{DA}$.

Another circuit (not shown in detail) with the same function formed by counter, adder and divider can be used to calculate the frame trailer time-delay $T_{d2}=|C_{21}-C_{22}|/F\_CLK_{DA}$. Where $C_{21}$ is the current count value of the counter when the switching pulse Ts arrives; $C_{22}$ is the current count value of the counter when the last data sample of the downlink frame arrives.

The above circuits for calculating $T_{d1}$ and $T_{d2}$ are merely illustrative, and various variations are also possible, for example, the circuits for calculating $T_{d1}$ and $T_{d2}$ contain respective counters respectively, but may share a subtracter and a divider; or even these two counters can be a same counter. It is obvious for those skilled in the art to implement the time-delay measurement means 180 in various other manners.

Various implementations of the wireless communication system base station according to the present invention have been described with reference to FIGS. 1-5 above. Those skilled in the art may understand that, other implementations that are not set forth explicitly but can be derived from the above description can also be obtained from the above various embodiments.

Figure 6:
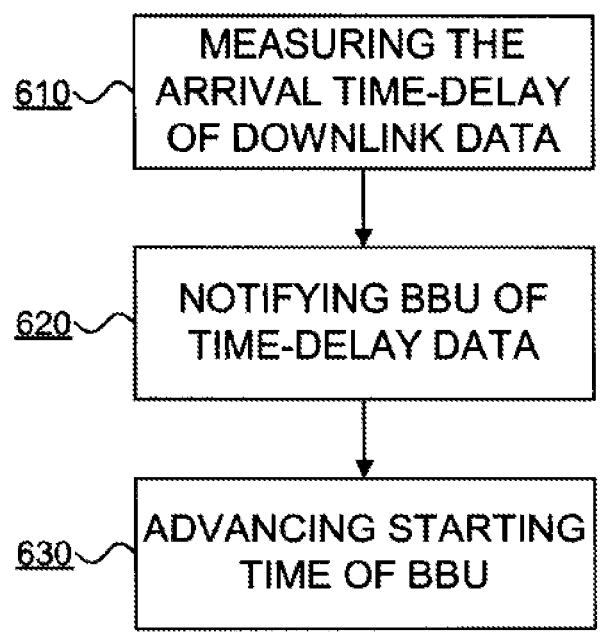
FIG. 6 schematically shows the flowchart of the method according to an embodiment of present invention.

With the same inventive conception, the present invention also provides a data transmission synchronization method for wireless communication system base station. FIG. 6 schematically shows the flowchart of the method according to an embodiment of the present invention.

The wireless communication system base station to which the data transmission synchronization method according to the embodiment of the present invention is applied comprises a remote radio head (RRH) and a baseband unit (BBU) communicably connected through a network, wherein the BBU is used to process and transmit downlink data to the RRH. As shown in the figure, the data transmission synchronization method of the present invention comprises the following steps: beginning at step 610, first of all, measuring a time-delay for the downlink data to arrive at the RRH from the BBU; at step 620, notifying from the RRH to the BBU of time-delay data $T_D$ on the measured time-delay; at step 630, advancing the starting time for the BBU to process and transmit the downlink data by an amount of time obtained based on the notified time-delay data.

According to an embodiment of the present invention, the time-delay for the downlink data to arrive at the RRH from the BBU can be measured in the following manner: measuring the time difference $T_{d1}$ between the time when the digital-to-analog (D/A) converter contained in the RRH begins to transmit downlink data to the mobile communication device and the time when the first data sample of the data frame of the downlink data arrives at the RRH, which is also called a first time difference herein. Thus, the first time difference $T_{d1}$ is contained in the time-delay data $T_D$ on the measured time-delay notified from the RRH to the BBU at step 620; and the amount of time equals to the first time difference $T_{d1}$.

According to an embodiment of the present invention, the time-delay for the downlink data to arrive at the RRH from the BBU can be measured in the following manner: measuring the time difference $T_{d2}$ between the time when the wireless communication system base station switches from downlink mode to uplink mode and the time when the last data sample of the data frame of the downlink data arrives at the RRH, which is also called a second time difference herein. Thus, besides the first time difference $T_{d1}$ the second time difference $T_{d2}$ is contained in the time-delay data $T_D$ on the measured time-delay notified from the RRH to the BBU at step 620.

According to an embodiment of the present invention, in the case of the time-delay data $T_D$ contains the first time difference $T_{d1}$ and the second time difference $T_{d2}$, at step 630, the starting time for the BBU to process and transmit the downlink data is advanced by an amount of time that equals to the larger one of the first time difference $T_{d1}$ and the second time difference $T_{d2}$, based on the first time difference $T_{d1}$ and the second time difference $T_{d2}$ of the notified time-delay data.

According to a modification, at step 630, based on the first and second time differences $T_{d1}$ and $T_{d2}$ of the notified time-delay data, the amount of time by which the starting time of downlink data processing and transmission of the BBU is advanced equals to the sum of the average of the difference between $T_{d2}$ and $T_{d1}$ for each of N periods prior to the current uplink-downlink period and the current $T_{d1}$, wherein N is an integer larger than 1.

According to another modification, measuring the first time difference $T_{d1}$ between the time when the D/A converter begins to transmit downlink data to the mobile communication device and the time when the first data sample of data frame of the downlink data arrives at the RRH can be realized through measuring, as the first time difference $T_{d1}$, the time difference between the time when the downlink pulse $T_{DL}$ for triggering the D/A converter to transmit downlink data to the mobile communication device is generated and the time when the first data sample of the downlink frame from the BBU arrives at the downlink unit.

A pulse generator is used to generate the switching pulse $T_s$ for triggering the wireless communication system base station to switch between uplink mode and downlink mode, and measuring the second time difference $T_{d2}$ between the time when the wireless communication system base station is switched from downlink mode to uplink mode and the time when the last data sample of data frame of the downlink data arrives at the RRH can be realized through measuring, as the second time difference $T_{d2}$, the time difference between the time when the pulse generator generates the switching pulse $T_s$ for triggering the wireless communication system base station to switch between uplink mode and downlink mode and the time when the last data sample of the downlink frame from the BBU arrives at the downlink unit.

Advancing the starting time for the BBU to process and transmit the downlink data by an amount of time obtained based on the notified time-delay data further comprises: generating a time-delayed clock pulse based on the timing baseband processing pulse generated by the timer within the BBU for triggering the downlink data processing unit of the BBU to start the downlink data processing and transmission and the time-delay data; replacing the timing baseband processing pulse generated by the timer with the time-delayed clock pulse to trigger the downlink data processing unit of BBU to start the downlink data processing and transmission, so that the starting time for the downlink data processing unit to process and transmit the downlink data is advanced by the amount of time.

The data transmission synchronization method for the wireless communication system base station of the present invention has been outlined above. It will be noted that, for the purpose of concise, many details identical or similar to that disclosed for the wireless communication system base station according to the present invention are omitted. However, those skilled in the art may understand that, according to the above description of the wireless communication system base station and its various implementations in the present invention, various implementations of the present invention can be implemented.

The present invention and some exemplary embodiments of the present invention have been described with reference to the drawings, however, it should be understood that, the present invention is not strictly limited to those embodiments. Various modifications and variations can be made by those skilled in the art without departing the scope and spirit of the present invention, and all these modifications and variations are intended to be included in the scope of the present invention defined by the appended claims.

Those skilled in the art will appreciate that the present invention can be embodied as apparatus, method and computer program product. Therefore, the present invention can be implemented, for example, wholly in hardware, wholly in software (including firmware, resident software, or microcode), or a combination of software and hardware which are generally called as "circuit", "module" or "system" herein. Further, the present invention can be embodied as a computer program product in any tangible expression medium having computer usable program code.

Any combination of one or more computer usable or computer readable medium(s) may be utilized. The computer usable or computer readable medium, for example, may be, but not limited to, an electronic, magnetic, optical, electromagnetic, infrared, or semiconductor system, apparatus, device, or propagation medium. More specific examples (a non-exhaustive list) of the computer-readable medium would include: an electrical connection having one or more wires, a portable computer diskette, a hard disk, a random access memory (RAM), a read-only memory (ROM), an erasable programmable read-only memory (e.g., EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or other suitable medium upon which the program is printed, as the program can be electronically obtained via, for instance, electronically scanning the paper or other medium, then compiled, interpreted, or processed in a suitable manner, and then stored in a computer memory if necessary. In the context of this document, a computer-usable or computer-readable medium may be any medium that can contain, store, communicate, propagate, or transport the program for use by or be associated with the instruction execution system, apparatus, or device. The computer-usable medium may include data signal having computer-usable program code embodied therein, propagated either in base band or as part of a carrier wave. The computer usable program code may be transmitted using any appropriate medium, including but not limited to wireless, wire line, optical fiber cable, RF, and the like.

Computer program code for carrying out operations of the present application may be written in any combination of one or more programming languages, including an object oriented programming language such as Java, Smalltalk, C++, and the like and conventional procedural programming languages, such as the "C" programming language or similar programming languages. The program code may be executed entirely on the user's computer, partly on the user's computer, as a stand-alone software package, partly on the user's computer and partly on a remote computer, or entirely on the remote computer or server. In the latter scenario, the remote computer may be connected to the user's computer through any types of network, including a local area network (LAN) or a wide area network (WAN), or may be connected to an external computer (for example, through the Internet using an Internet Service Provider).

Further, each block of the flowchart and/or block diagrams, and combinations of blocks of the flowchart and/or block diagrams, can be implemented by computer program instructions. These computer program instructions may be provided to a processor of a general purpose computer, special purpose computer, or other programmable data processing apparatus to produce a machine, such that the instructions, which can be executed via the processor of the computer or other programmable data processing apparatus, create means for implementing the functions/operations specified in the blocks of flowchart and/or block diagram.

These computer program instructions may also be stored in a computer-readable medium that can instruct a computer or other programmable data processing apparatus to function in a particular manner, such that the instructions stored in the computer-readable medium produce an article of manufacture including instruction means which implement the function/operation specified in the blocks of flowchart and/or block diagram.

The computer program instructions may also be loaded onto a computer or other programmable data processing apparatus to cause a series of operational steps to be performed on the computer or other programmable apparatus to produce a computer implemented process such that the instructions to be executed on the computer or other programmable apparatus provide processes for implementing the functions/operations specified in the blocks of flowchart and/or block diagram.

The flowcharts and block diagrams in the figures illustrate the architecture, functionality, and operation of possible implementations of systems, methods and computer program products according to various embodiments of the present invention. In this regard, each block in the flowchart or block diagram may represent a module, program segment, or a portion of codes, which comprises one or more executable instructions for implementing the specified logical function(s). It should also be noted that, in some alternative implementations, the functions noted in the block may occur in an order different from the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart, and combinations of blocks in the block diagram and/or flowchart, can be implemented by special purpose hardware-based systems which perform the specified functions or operations, or combinations of special purpose hardware and computer instructions.

The invention claimed is:

1. A remote radio head (RRH) for a wireless communication system base station, wherein the RRH is communicably coupled to a baseband unit (BBU) of the wireless communication system base station through a network, and wherein the BBU processes and transmits downlink data to the RRH, the RRH comprising:
    a time-delay measurement unit for measuring a time-delay for the downlink data to arrive at the RRH from the BBU;
    a time-delay notification unit for notifying from the RRH to the BBU of time-delay data on the time-delay measured by the time-delay measurement unit;
    wherein the time-delay data is used to advance the starting time for the BBU to process and transmit the downlink data by an amount of time obtained based on the time-delay data;
    a digital to analog (D/A) converter for transmitting the downlink data to a wireless communication device;
    wherein the time-delay measurement unit comprises a frame header time-delay measurement means for measuring a first time difference $T_{d1}$ between the time when the D/A converter begins to transmit the downlink data to the wireless communication device and the time when a first data sample of a data frame of the downlink data arrives at the RRH, wherein the time-delay data comprises the first time difference $T_{d1}$;
    a downlink unit for receiving downlink data from the BBU; and
    a pulse generator for generating a downlink pulse $T_{DL}$ for triggering the D/A converter to transmit downlink data to the wireless communication device;
    wherein the frame header time-delay measurement means comprises means for measuring the first time difference $T_{d1}$ between the time when the downlink pulse $T_{DL}$ is generated and the time when the first data sample of the downlink frame from the BBU arrives at the downlink unit.

2. The RRH according to claim 1, wherein the wireless communication system base station in which the remote radio head (RRH) is located is switched between a downlink mode and an uplink mode; and wherein the time-delay measurement unit further comprises:
    a frame trailer time-delay measurement means for measuring a second time difference $T_{d2}$ between the time when the wireless communication system base station is switched to the uplink mode from the downlink mode and the time when a last data sample of the data frame of the downlink data arrives at the RRH;

wherein the time-delay data further comprises the second time difference $T_{d2}$.

3. The RRH according to claim 1, wherein the amount of time equals the first time difference $T_{d1}$.

4. The RRH according to claim 2, wherein the amount of time equals the larger of the first time difference $T_{d1}$ and the second time difference $T_{d2}$.

5. The RRH according to claim 2, wherein the amount of time equals to the sum of the average of the difference between the first time difference $T_{d1}$ and the second time difference $T_{d2}$ of each N period prior to the current uplink-downlink period and the current $T_{d1}$, wherein N is an integer larger than 1.

6. The RRH according to claim 2, further comprising a pulse generator for generating a switching pulse $T_s$ for triggering the wireless communication system base station to switch between the downlink mode and the uplink mode, wherein the frame trailer time-delay measurement means further comprises:

means for measuring the second time difference $T_{d2}$ between the time when the switching pulse $T_s$ is issued and the time when the last data sample of the downlink frame from the BBU arrives at the downlink unit.

7. A wireless communication system base station, comprising a baseband unit (BBU) and a remote radio head (RRH) which is communicably connected through a network, wherein the BBU comprises:

a synchronization unit for advancing the starting time for the BBU to process and transmit a downlink data by an amount of time obtained based on a time-delay data notified by a time-delay notification unit, and wherein the RRH comprises:

a time-delay measurement unit for measuring a time-delay for the downlink data to arrive at the RRH from the BBU;

the time-delay notification unit for notifying from the RRH to the BBU of the time-delay data on the time-delay measured by the time-delay measurement unit;

wherein the time-delay data is used to advance the starting time for the BBU to process and transmit the downlink data by the amount of time obtained based on the time-delay data;

a digital to analog (D/A) converter for transmitting the downlink data to a wireless communication device;

wherein the time-delay measurement unit comprises a frame header time-delay measurement means for measuring a first time difference $T_{d1}$ between the time when the D/A converter begins to transmit the downlink data to the wireless communication device and the time when a first data sample of a data frame of the downlink data arrives at the RRH, wherein the time-delay data comprises the first time difference $T_{d1}$;

a downlink unit for receiving downlink data from the BBU; and a pulse generator for generating a downlink pulse $T_{DL}$ for triggering the D/A converter to transmit downlink data to the wireless communication device;

wherein the frame header time-delay measurement means comprises means for measuring the first time difference $T_{d1}$ between the time when the downlink pulse $T_{DL}$ is generated and the time when the first data sample of the downlink frame from the BBU arrives at the downlink unit.

8. The wireless communication system base station according to claim 7, wherein:

the BBU further comprises: (i) a downlink data processing unit for processing and transmitting the downlink data, and (ii) a timer for generating a timing baseband processing pulse for triggering the downlink data processing unit to start the downlink data processing and transmission, and the synchronization unit further comprises a timing correction unit for generating a time-delayed clock pulse to replace the timing baseband processing pulse based on the timing baseband processing pulse and the time-delay data, so as to advance the starting time for the downlink data processing unit to process and transmit the downlink data by the amount of time.

9. The wireless communication system base station according to claim 7, wherein:

the wireless communication system base station is switched between a downlink mode and an uplink mode; and wherein the time-delay measurement unit further comprises a frame trailer time-delay measurement means for measuring a second time difference $T_{d2}$ between the time when the wireless communication system base station is switched to the uplink mode from the downlink mode and the time when a last data sample of the data frame of the downlink data arrives at the RRH;

wherein the time-delay data further comprises the second time difference $T_{d2}$.

10. The wireless communication system base station according to claim 7, wherein the amount of time equals the first time difference $T_{d1}$.

11. The wireless communication system base station according to claim 9, wherein the amount of time equals the larger of the first time difference $T_{d1}$ and the second time difference $T_{d2}$.

12. The wireless communication system base station according to claim 9, wherein the amount of time equals to the sum of the average of the difference between the first time difference $T_{d1}$ and the second time difference $T_{d2}$ of each N period prior to the current uplink-downlink period and the current $T_{d1}$, wherein N is an integer larger than 1.

13. The wireless communication system base station according to claim 9, wherein:

the RRH further comprises and a pulse generator for generating a switching pulse $T_s$ for triggering the wireless communication system base station to switch between the downlink mode and the uplink mode, wherein the frame trailer time-delay measurement means further comprises:

means for measuring the second time difference $T_{d2}$ between the time when the switching pulse $T_s$ is issued and the time when the last data sample of the downlink frame from the BBU arrives at the downlink unit.

14. A remote radio head (RRH) for a wireless communication system base station, wherein the RRH is communicably coupled to a baseband unit (BBU) of the wireless communication system base station through a network, and wherein the BBU processes and transmits downlink data to the RRH, the RRH comprising:

a time-delay measurement unit for measuring a time-delay for the downlink data to arrive at the RRH from the BBU;

a time-delay notification unit for notifying from the RRH to the BBU of time delay data on the time-delay measured by the time-delay measurement unit;

wherein the time-delay data is used to advance the starting time for the BBU to process and transmit the downlink data by an amount of time obtained based on the time-delay data;

a digital to analog (D/A) converter for transmitting the downlink data to a wireless communication device;

wherein the time-delay measurement unit comprises a frame header time delay measurement means for measuring a first time difference $T_{d1}$ between the time when the D/A converter begins to transmit the downlink data to the wireless communication device and the time when a first data sample of a data frame of the downlink data arrives at the RRH;

wherein the time-delay data comprises the first time difference $T_{d1}$;

wherein the wireless communication system base station in which the remote radio head (RRH) is located is switched between a downlink mode and an uplink mode;

wherein the time-delay measurement unit further comprises a frame trailer time-delay measurement means for measuring a second time difference $T_{d2}$ between the time when the wireless communication system base station is switched to the uplink mode from the downlink mode and the time when a last data sample of the data frame of the downlink data arrives at the RRH; and wherein the time-delay data further comprises the second time difference $T_{d2}$;

wherein the amount of time equals to the sum of the average of the difference between the first time difference $T_{d1}$ and the second time difference $T_{d2}$ of each N period prior to the current uplink-downlink period and the current $T_{d1}$, wherein N is an integer larger than 1.

15. A remote radio head (RRH) for a wireless communication system base station, wherein the RRH is communicably coupled to a baseband unit (BBU) of the wireless communication system base station through a network, and wherein the BBU processes and transmits downlink data to the RRH, the RRH comprising:

a time-delay measurement unit for measuring a time-delay for the downlink data to arrive at the RRH from the BBU;

a time-delay notification unit for notifying from the RRH to the BBU of time-delay data on the time-delay measured by the time-delay measurement unit;

wherein the time-delay data is used to advance the starting time for the BBU to process and transmit the downlink data by an amount of time obtained based on the time-delay data;

a digital to analog (D/A) converter for transmitting the downlink data to a wireless communication device;

wherein the time-delay measurement unit comprises a frame header time-delay measurement means for measuring a first time difference $T_{d1}$ between the time when the D/A converter begins to transmit the downlink data to the wireless communication device and the time when a first data sample of a data frame of the downlink data arrives at the RRH;

wherein the time-delay data comprises the first time difference $T_{d1}$;

wherein the wireless communication system base station in which the remote radio head (RRH) is located is switched between a downlink mode and an uplink mode;

wherein the time-delay measurement unit further comprises a frame trailer time-delay measurement means for measuring a second time difference $T_{d2}$ between the time when the wireless communication system base station is switched to the uplink mode from the downlink mode and the time when a last data sample of the data frame of the downlink data arrives at the RRH;

wherein the time-delay data further comprises the second time difference $T_{d2}$; and a downlink unit for receiving downlink data from the BBU and a pulse generator for generating a switching pulse $T_s$ for triggering the wireless communication system base station to switch between the downlink mode and the uplink mode;

wherein the frame trailer time-delay measurement means further comprises:

means for measuring the second time difference $T_{d2}$ between the time when the switching pulse $T_s$ is issued and the time when the last data sample of the downlink frame from the BBU arrives at the downlink unit.

16. The RRH according to claim 15, wherein the amount of time equals the first time difference $T_{d1}$.

17. The RRH according to claim 15, wherein the amount of time equals the larger of the first time difference $T_{d1}$ and the second time difference $T_{d2}$.

* * * * *